UNITED STATES PATENT OFFICE.

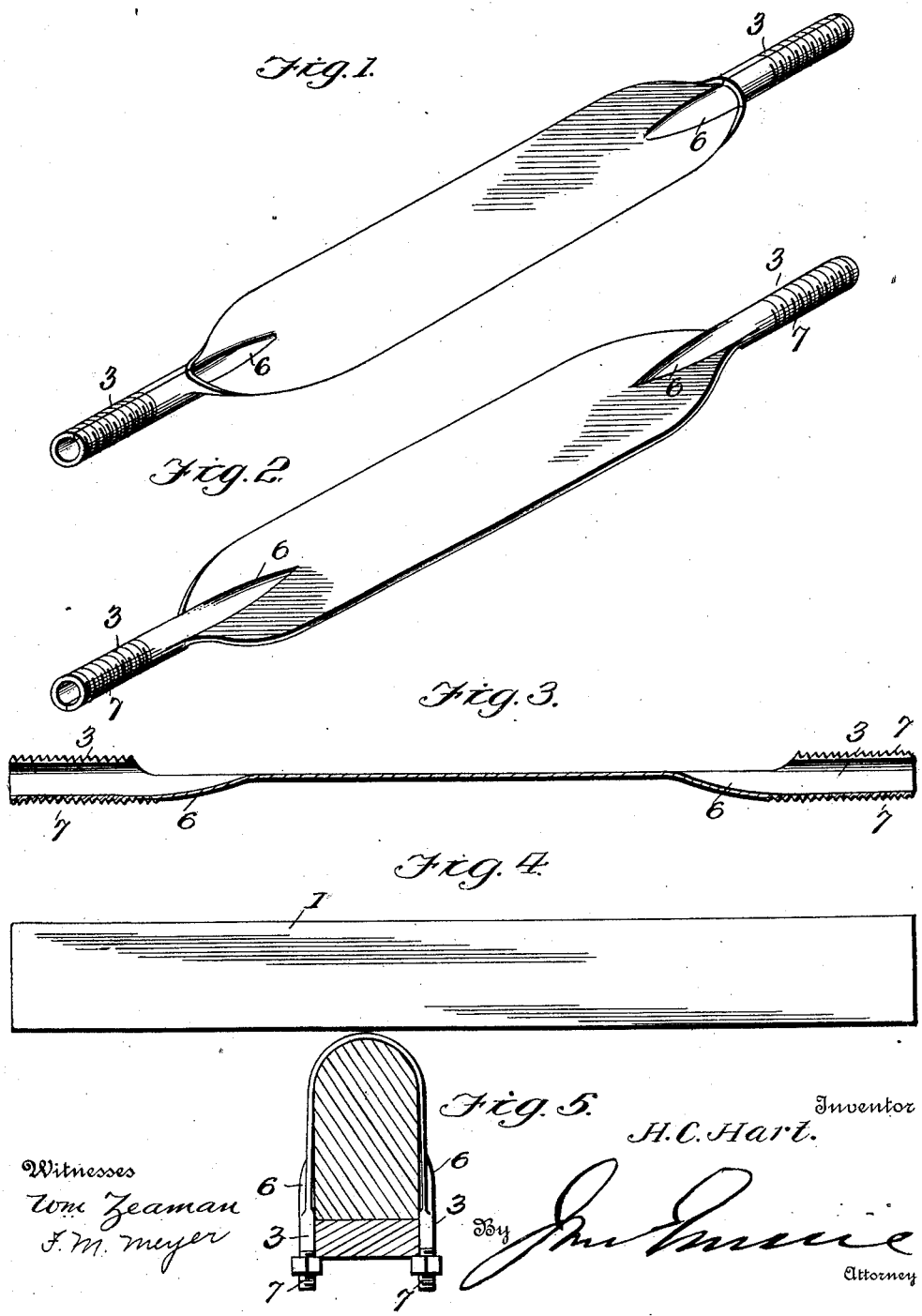

HUBERT C. HART, OF UNIONVILLE, CONNECTICUT.

WAGON-AXLE CLIP.

990,733.　　　　Specification of Letters Patent.　　Patented Apr. 25, 1911.

Application filed May 6, 1910.　Serial No. 559,776.

*To all whom it may concern:*

Be it known that I, HUBERT C. HART, a citizen of the United States, residing at Unionville, in the county of Hartford and State of Connecticut, have invented certain new and useful Improvements in Wagon-Axle Clips; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in wagon axle clips and the method of making the same.

According to my invention I first cut a strip of metal the desired length, and form the ends into hollow extensions which are afterward threaded for the reception of the coöperating nuts.

Heretofore, wagon axle clips have been made by severing into sections round rods, and then flattening the intermediate portions and subsequently threading the ends. This method is not only expensive but occasions delay in manufacture.

The object of my invention is to utilize a flat piece of metal, and bend the ends by swaging to provide cylindrical extensions for the reception of the coöperating nuts.

The invention also relates to improvements in the specific details of construction, which will be hereinafter described and particularly pointed out in the claim.

In the drawings:—Figure 1 is a perspective view looking from one side of the clip, before being shaped. Fig. 2 is a similar view of the reverse side. Fig. 3 is a transverse section of the same. Fig. 4 is a view of a blank from which the clip is formed. Fig. 5 is a section showing the complete clip in use.

The same numerals refer to like parts in all the figures.

1 indicates a blank flat strip of metal, from which the clip is made. The ends of the strip 1 are first bent up in U-form, to primarily form what I shall term the end horn 3—3. After the ends are bent in U-form they are further bent or swaged to bring the edges together, thereby providing the hollow extensions or horns. The center of the horns are in a plane with the center of the strip 1, so that on one side of the strip will be formed strengthening ribs 6 which gradually merge into the surface of the strip. After the horns are formed they are threaded as at 7, and then the metal is bent or shaped into U-form to embrace the bolster and axle of the wagon as shown in Fig. 5.

A clip formed as described can be made at small expense and absolutely no metal is lost in the operation.

It is also evident the clips can be quickly and conveniently manufactured and will be extremely light in weight.

The reinforcing ribs on the outer face of the strip serve to materially strengthen the clips.

The method of manufacturing the clips from flat strips of metal, like the article is decidedly more economical than forming the clips by flattening and subsequently bending the strip.

What I claim is:

As an improved article of manufacture, a wagon axle clip having threaded hollow horns at its ends, said horns being open at their inner ends, the extended portion of the horns adjacent the open ends serving as braces for reinforcing the clip.

In testimony whereof I have signed my name to this specification in the presence of two subscribing witnesses.

HUBERT C. HART.

Witnesses:
NELLIE M. HART,
WILLIS O. HART.

Copies of this patent may be obtained for five cents each, by addressing the "Commissioner of Patents, Washington, D. C."